United States Patent
Mukhopadhyay et al.

(10) Patent No.: US 8,069,937 B2
(45) Date of Patent: Dec. 6, 2011

(54) POLYCRYSTALLINE DIAMOND COMPACT INCLUDING A CEMENTED TUNGSTEN CARBIDE SUBSTRATE THAT IS SUBSTANTIALLY FREE OF TUNGSTEN CARBIDE GRAINS EXHIBITING ABNORMAL GRAIN GROWTH AND APPLICATIONS THEREFOR

(75) Inventors: Debkumar Mukhopadhyay, Sandy, UT (US); Kenneth E. Bertagnolli, Riverton, UT (US); Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 268 days.

(21) Appl. No.: 12/393,391

(22) Filed: Feb. 26, 2009

(65) Prior Publication Data

US 2010/0212971 A1    Aug. 26, 2010

(51) Int. Cl.
*E21B 10/46* (2006.01)
(52) U.S. Cl. .................. 175/434; 175/428; 175/432
(58) Field of Classification Search .......... 175/428, 175/432, 434, 420.2, 426
See application file for complete search history.

(56) References Cited

U.S. PATENT DOCUMENTS

| | | | |
|---|---|---|---|
| 3,918,138 A * | 11/1975 | Nemeth et al. .................. 75/237 |
| 4,268,276 A | 5/1981 | Bovenkerk |
| 4,274,900 A | 6/1981 | Mueller et al. |
| 4,410,054 A | 10/1983 | Nagel et al. |
| 4,468,138 A | 8/1984 | Nagel |
| 4,560,014 A | 12/1985 | Geczy |
| 4,738,322 A | 4/1988 | Hall et al. |
| 4,743,515 A | 5/1988 | Fischer et al. |
| 4,778,486 A | 10/1988 | Csillag et al. |
| 4,811,801 A | 3/1989 | Salesky et al. |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |

(Continued)

FOREIGN PATENT DOCUMENTS

DE    2905452 A1    9/1979

(Continued)

OTHER PUBLICATIONS

WD Schubert, A Bock, B Lux "General aspects and limits of conventional ultrafine WC powder manufacture and hard metal production" 1995, International Journal of Refractory Metals & Hard Materials 13, pp. 289-292.*

(Continued)

*Primary Examiner* — William P Neuder
*Assistant Examiner* — Cathleen Hutchins
(74) *Attorney, Agent, or Firm* — Workman Nydegger

(57) ABSTRACT

Embodiments relate to polycrystalline diamond compacts ("PDCs") including a polycrystalline diamond ("PCD") table that is substantially free of defects formed due to abnormal grain growth of tungsten carbide grains, and methods of fabricating such PDCs. In an embodiment, a PDC comprises a cemented tungsten carbide substrate including an interfacial surface that is substantially free of tungsten carbide grains exhibiting abnormal grain growth, and a PCD table bonded to the interfacial surface of the cemented tungsten carbide substrate. The PCD table includes a plurality of bonded diamond grains defining a plurality of interstitial regions. At least a portion of the interstitial regions includes a metal-solvent catalyst disposed therein. The PCD table may be substantially free of chromium or the PCD table and the cemented tungsten carbide substrate may each include chromium.

13 Claims, 6 Drawing Sheets

U.S. PATENT DOCUMENTS

| | | | |
|---|---|---|---|
| 5,135,061 A | 8/1992 | Newton, Jr. | |
| 5,154,245 A | 10/1992 | Waldenstrom et al. | |
| 5,217,081 A | 6/1993 | Waldenstrom et al. | |
| 5,335,738 A | 8/1994 | Waldenstrom et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,624,068 A | 4/1997 | Waldenstrom et al. | |
| 5,891,522 A | 4/1999 | Olson | |
| 6,267,867 B1 | 7/2001 | Olson | |
| 6,268,045 B1 * | 7/2001 | Leyendecker et al. | 428/216 |
| 6,524,363 B2 | 2/2003 | Gates, Jr. et al. | |
| 6,793,681 B1 | 9/2004 | Pope et al. | |
| 6,915,866 B2 | 7/2005 | Middlemiss | |
| 7,556,668 B2 | 7/2009 | Eason et al. | |
| 2002/0081433 A1 | 6/2002 | Baik et al. | |
| 2004/0141867 A1 * | 7/2004 | Dreyer et al. | 419/8 |
| 2005/0263328 A1 | 12/2005 | Middlemiss | |
| 2007/0079994 A1 * | 4/2007 | Middlemiss | 175/426 |
| 2007/0144790 A1 | 6/2007 | Fang et al. | |
| 2008/0223623 A1 | 9/2008 | Keshavan et al. | |
| 2010/0126779 A1 | 5/2010 | Corbett et al. | |

FOREIGN PATENT DOCUMENTS

| | | |
|---|---|---|
| WO | 2005068113 A1 | 7/2005 |
| WO | 2008053430 A1 | 5/2008 |
| WO | 2010046860 A1 | 4/2010 |
| WO | WO 2010/098978 | 9/2010 |

OTHER PUBLICATIONS

Minoru Akaishi et al.: Synthesis of Fine-Grained Polycrystalline Diamond Compact and Its Microstructure, J. Am. Ceram. Soc., vol. 74, No. 1, 1991, pp. 5-10.

International Search Report and Written Opinion, mailed Jun. 28, 2010, as issued in connection with corresponding Patent Application No. PCT/US2010/023692, filed on Feb. 10, 2010.

U.S. Appl. No. 12/185,457, filed Aug. 4, 2008, Vail et al.

* cited by examiner

POLYCRYSTALLINE DIAMOND COMPACT INCLUDING A CEMENTED TUNGSTEN CARBIDE SUBSTRATE THAT IS SUBSTANTIALLY FREE OF TUNGSTEN CARBIDE GRAINS EXHIBITING ABNORMAL GRAIN GROWTH AND APPLICATIONS THEREFOR

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a cemented carbide substrate using a high-pressure/high-temperature ("HPHT") process. The PDC cutting element may be brazed directly into a preformed pocket, socket, or other receptacle formed in a bit body. The cemented carbide substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented tungsten carbide substrate into a container with a volume of diamond particles positioned on a surface of the cemented tungsten carbide substrate. A number of such containers may be loaded into an HPHT press. The substrate(s) and volume(s) of diamond particles are then processed under diamond-stable HPHT conditions. During the HPHT process, a metal-solvent catalyst cementing constituent of the cemented tungsten carbide substrate, such as cobalt from a cobalt-cemented tungsten carbide substrate, liquefies and infiltrates into interstitial regions between the diamond particles. The cobalt acts as a catalyst to promote intergrowth between the diamond particles, which results in formation of a polycrystalline diamond ("PCD") table of bonded diamond grains having diamond-to-diamond bonding therebetween that is bonded to the cemented tungsten carbide substrate. Interstitial regions between the bonded diamond grains are occupied by the metal-solvent catalyst.

During the HPHT process, tungsten carbide grains in a region of the cemented tungsten carbide substrate located adjacent to the PCD table can experience significant abnormal grain growth ("AGG"). Such tungsten carbide grains that exhibit abnormal grain growth can project from the cemented tungsten carbide substrate into the PCD table to thereby introduce stress concentrations and/or defects that can cause the PCD table to delaminate from the cemented tungsten carbide substrate when loaded during subterranean drilling operations. FIG. 1 is a photomicrograph of a microstructure 100 of a PDC taken at a magnification of 750 times in a scanning electron microscope that shows tungsten carbide grains 102 that exhibit AGG projecting from a cemented tungsten carbide substrate 104 into a PCD table 106. As shown in FIG. 1, the tungsten carbide grains 102 have experienced significant grain growth compared to other unaffected tungsten carbide grains 108 of the cemented tungsten carbide substrate 104. For example, the tungsten carbide gains 102 can be about five to about thirty times the average grain size of the unaffected tungsten carbide grains 108 and may exhibit an aspect ratio of fifty to one in some cases.

SUMMARY

Embodiments of the invention relate to PDCs including a PCD table that is substantially free of defects formed due to AGG of tungsten carbide grains, and methods of fabricating such PDCs by bonding a PCD table to or integrally forming a PCD table with a cemented carbide substrate that includes one or more types of carbon-deficient tungsten-containing eta phases prior to HPHT processing. In an embodiment, a PDC comprises a cemented tungsten carbide substrate including an interfacial surface that is substantially free of tungsten carbide grains exhibiting AGG, and a PCD table bonded to the interfacial surface of the cemented tungsten carbide substrate. The PCD table includes a plurality of bonded diamond grains defining a plurality of interstitial regions. At least a portion of the interstitial regions includes a metal-solvent catalyst disposed therein. In some embodiments, the PCD table may be substantially free of chromium. In other embodiments, the PCD table and the cemented tungsten carbide substrate may each include chromium.

In an embodiment, a method of fabricating a PDC is disclosed. The method includes positioning a plurality of diamond particles adjacent to a cemented carbide material. The cemented carbide material includes one or more tungsten-containing eta phases. The method further includes subjecting the plurality of diamond particles and the cemented carbide material to an HPHT process to sinter the plurality of diamond particles so that the PCD table is formed. In an embodiment, the cemented carbide material may be in the form of a cemented carbide substrate including the one or more tungsten-containing eta phases. In an embodiment, the cemented carbide material may be in the form of cemented carbide particles positioned between the plurality of diamond particles and a cemented tungsten carbide substrate.

In an embodiment, a method of fabricating a PDC includes positioning a combination adjacent to a cemented carbide substrate. The combination may include a plurality of diamond particles and a plurality carbide-forming particles, a plurality carbon-deficient carbide particles, a cemented carbide material including one or more tungsten-containing eta phases, or combinations thereof. The method further includes subjecting the combination and the cemented carbide substrate to an HPHT process to sinter the plurality of diamond particles so that a PCD table is formed In an embodiment, a PDC includes a cemented tungsten carbide substrate including a table interfacial surface, and a pre-sintered PCD table including bonded diamond grains defining interstitial regions and a tungsten-containing material. The pre-sintered PCD table is substantially free of defects formed due to AGG of tungsten carbide grains during the fabrication thereof. The pre-sintered PCD table further includes a first region extending inwardly from an upper surface and a second region extending inwardly from a substrate interfacial surface that is bonded to the table interfacial surface of the cemented tungsten carbide substrate. The interstitial regions of the second region include an infiltrant disposed therein.

In an embodiment, a method of fabricating a PDC is disclosed. The method includes positioning an at least partially leached PCD table at least proximate to a cemented carbide substrate. The at least partially leached PCD table is substantially free of defects formed due to tungsten carbide grains exhibiting AGG during the fabrication thereof. The method further includes subjecting the at least partially leached PCD table and the cemented carbide substrate to an HPHT process to at least partially infiltrate the at least partially leached PCD table with a metal-solvent catalyst. In some embodiment, the at least partially leached PCD table includes a tungsten-containing material, the cemented carbide substrate includes one or more tungsten-containing eta phases, and/or a plurality carbide-forming particles, a plurality carbon-deficient carbide particles, a cemented carbide material including one or more tungsten-containing eta phases, or combinations thereof may be positioned between the at least partially leached PCD table and the cemented carbide substrate.

Other embodiments include applications utilizing the disclosed PDCs in various articles and apparatuses, such as rotary drill bits, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a PCD table that is substantially free of defects formed due to tungsten carbide grains exhibiting AGG, and methods of fabricating such PDCs by bonding a PCD table to or integrally forming a PCD table with a cemented carbide substrate that includes one or more types of carbon-deficient tungsten-containing eta phases prior to HPHT processing. The disclosed PDCs may be used in a variety of applications, such as rotary drill bits, machining equipment, and other articles and apparatuses.

Figure 1:
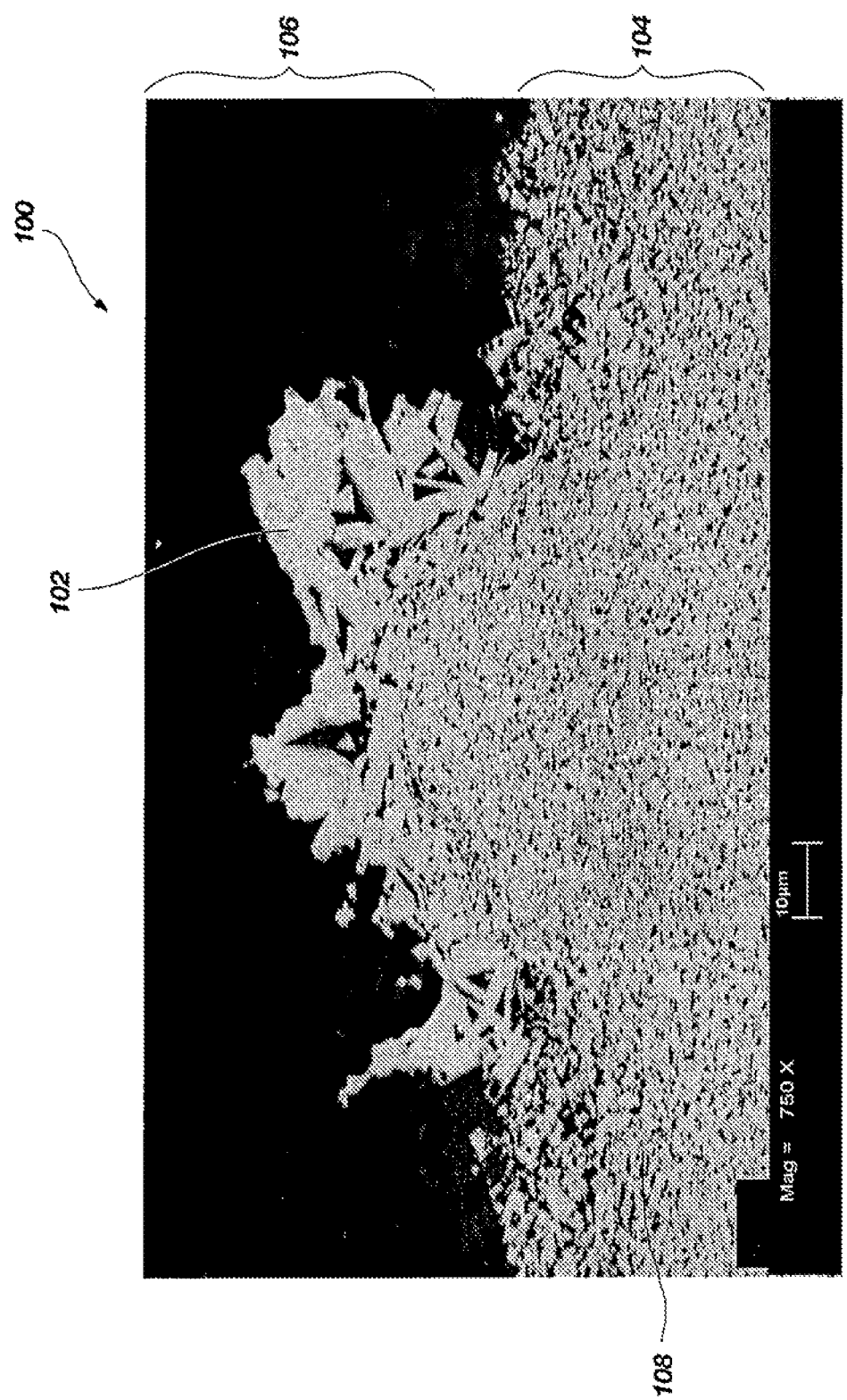
FIG. 1 is a photomicrograph of a microstructure of a PDC taken at a magnification of 750 times in a scanning electron microscope that shows tungsten carbide grains exhibiting AGG projecting from a cemented tungsten carbide substrate into a PCD table.
Figure 2:
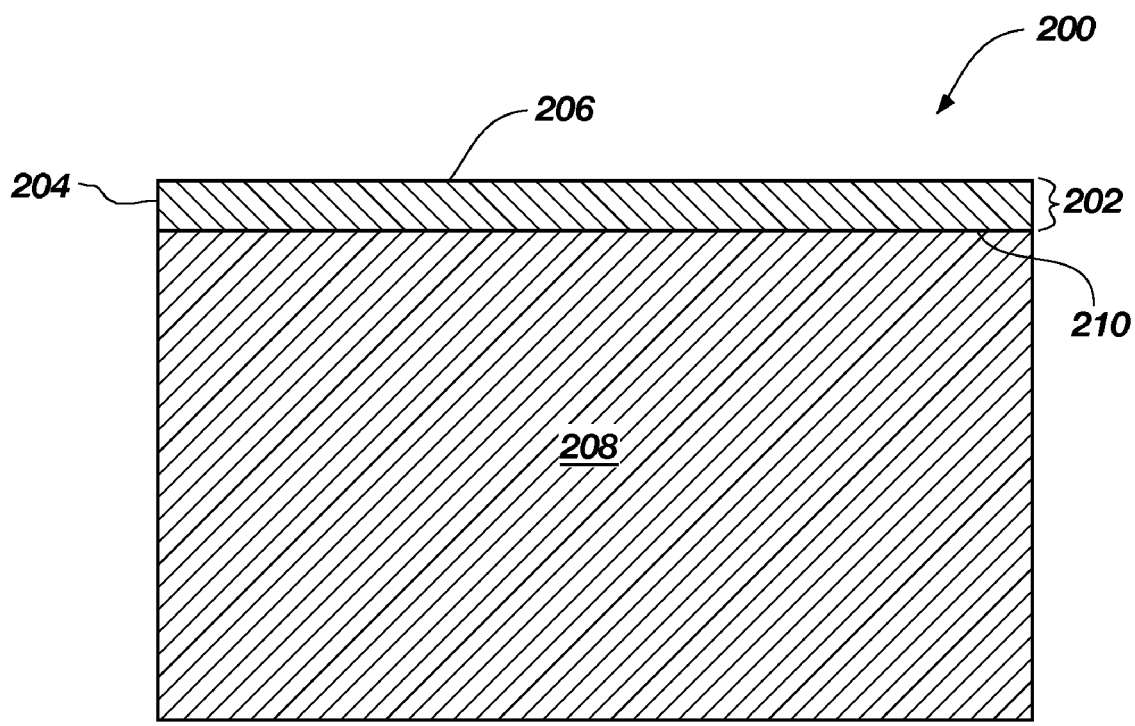
FIG. 2 is a cross-sectional view of an embodiment of a PDC including a PCD table integrally formed with a cemented tungsten carbide substrate that is substantially free of tungsten carbide grains exhibiting AGG.

FIG. 2 is a cross-sectional view of an embodiment of a PDC 200 including a PCD table 202 integrally formed with a cemented tungsten carbide substrate 208 that is substantially free of tungsten carbide grains exhibiting AGG. The PCD table 202 includes a plurality of directly bonded-together diamond grains exhibiting diamond-to-diamond bonding therebetween, which define a plurality of interstitial regions. The microstructure and mechanical properties of the PCD table 202 are characteristic of being formed in an HPHT process as opposed to being deposited, for example, by chemical or physical vapor deposition. The PCD table 202 includes at least one lateral surface 204 and a working, upper surface 206. It is noted that at least a portion of the at least one lateral surface 204 may also function as a working surface that contacts a subterranean formation during drilling operations.

A portion of or substantially all of the interstitial regions include a metal-solvent catalyst disposed therein. In some embodiments, the metal-solvent catalyst may be infiltrated from the cemented tungsten carbide substrate 208. In some embodiments, substantially all of the interstitial regions are filled with the metal-solvent catalyst. In other embodiments, a selected portion of the PCD table 202 may be depleted of the metal-solvent catalyst via a leaching process in an acid (e.g., aqua regia, nitric acid, hydrofluoric acid, or other suitable acid). In such an embodiment, the PCD table 202 includes a leached region from which the metal-solvent catalyst has been depleted. For example, the leached region may extend inwardly from the upper surface 206 to a selected depth (e.g., about 50 μm to about 1000 μm) within the PCD table 202, while the interstitial regions of a region of the PCD table 202 adjacent to the cemented tungsten carbide substrate 208 include metal-solvent catalyst therein. For example, in an embodiment, the selected depth may be about 200 μm to about 500 μm.

The cemented tungsten carbide substrate 208 includes an interfacial surface 210 that is bonded to the PCD table 202. The interfacial surface 210 is substantially free of tungsten carbide grains exhibiting AGG that project into the PCD table 202. Therefore, the interfacial surface 210 is characterized by being substantially free of tungsten carbide grains having an average grain size greater than an average grain size of the tungsten carbide grains remote from the interfacial surface 210. Accordingly, the PCD table 202 is substantially free of defects (e.g., pits) that are caused by such AGG of tungsten carbide grains during formation of the PCD table 202. In particular, the PCD table 202 is substantially free of such defects that project inwardly from a surface that is bonded to the interfacial surface 210 of the cemented tungsten carbide substrate 208. The cemented tungsten carbide substrate 208 comprises a plurality of tungsten carbide grains cemented together with a metal-solvent catalyst cementing constituent, such as cobalt, iron, nickel, or alloys thereof. For example, in an embodiment, the cemented tungsten carbide substrate 208 is a cobalt-cemented tungsten carbide substrate. The cemented tungsten carbide substrate 208 may also include one or more additional carbides besides tungsten carbide, such as tantalum carbide, vanadium carbide, niobium carbide, chromium carbide, titanium carbide, or combinations of the foregoing carbides. In an embodiment, the PCD table 202 may be substantially free of chromium (e.g., in substantially pure chromium, a chromium alloy, chromium carbide, or combinations thereof). For example, when the cemented tungsten carbide substrate 208 is substantially free of chromium, the PCD table 202 may be substantially free of chromium. In another embodiment, the PCD table 202 may include chromium (e.g., in substantially pure chromium, a chromium alloy, chromium carbide, or combinations thereof) infiltrated into the PCD table 202 from chromium present in the cemented tungsten carbide substrate 208 due to the presence of chromium carbide therein, mixed with the diamond particles that are sintered to form the PCD table 202, or combinations of the foregoing.

As will be discussed in more detail below with respect to FIG. 3, the cemented tungsten carbide substrate 208 initially includes one or more types of tungsten-containing eta phases prior to the PCD table 202 being formed in an HPHT process. Eta phase is a ternary compound of, for example, tungsten, cobalt, and carbon. For example, when the cemented tungsten carbide substrate 208 is a cobalt-cemented tungsten carbide substrate, the eta phase may be $Co_{3.2}W_{2.8}C$, $Co_2W_4C$, $Co_6W_6C$, or combinations of the foregoing. Other types of eta phases may also form when the metal-solvent catalyst cementing constituent is made from nickel, iron, or alloys thereof. However, in the PDC 200, subsequent to HPHT processing, the cemented tungsten carbide substrate 208 is substantially free of eta phase and substantially all of the tungsten carbide is stoichiometric in the form of WC. However, it is noted that depending upon the HPHT process conditions, in some embodiments the cemented tungsten carbide substrate 208 may include a residual amount of eta phase that is not converted to stoichiometric tungsten carbide ("WC") during formation of the PCD table 202.

In one embodiment, the metal-solvent catalyst cementing constituent may comprise about 3 to about 20 weight percent ("wt %") of the cemented tungsten carbide substrate 208, with the balance being substantially WC grains. In a more detailed embodiment, the metal-solvent catalyst cementing constituent may comprise about 9 to about 14 wt % of the cemented tungsten carbide substrate 208, with the balance being substantially WC grains. In some embodiments, the cemented tungsten carbide substrate 208 may also include carbides other than WC in small amounts, such as about 1 to about 3 wt % of tantalum carbide, vanadium carbide, niobium carbide, chromium carbide, titanium carbide, or combinations of the foregoing carbides.

Figure 3:
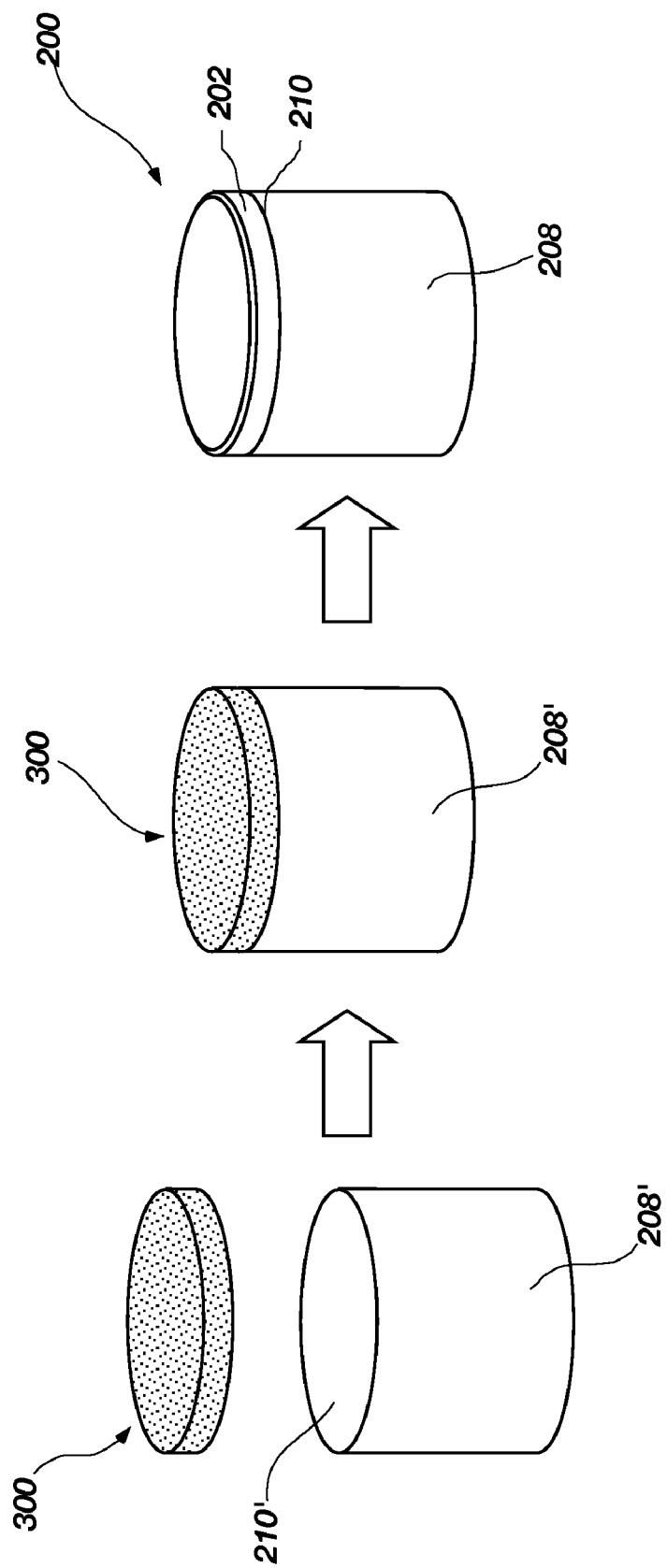
FIG. 3 is a schematic illustration of an embodiment of a method for fabricating the PDC shown in FIG. 2.

FIG. 3 is a schematic illustration of an embodiment of a method for fabricating the PDC 200 shown in FIG. 2. One or more layers of diamond particles 300 may be positioned adjacent to an interfacial surface 210' of a precursor cemented carbide substrate 208' that includes one or more types of tungsten-containing eta phases. The plurality of diamond particles of the one or more layers of diamond particles 300 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation. In some embodiments, chromium (e.g., in substantially pure chromium, a chromium alloy, chromium carbide, or combinations thereof) may be mixed with the diamond particles.

As discussed above, the precursor cemented carbide substrate 208' includes one or more types of tungsten-containing eta phases cemented with any of the aforementioned metal-solvent catalyst cementing constituents. For example, when the precursor cemented carbide substrate 208' includes cobalt as the metal-solvent catalyst cementing constituent, the eta phase is typically $Co_{3.2}W_{2.8}C$, $Co_2W_4C$, $Co_6W_6C$, or combinations of the foregoing.

In some embodiments, the precursor cemented carbide substrate 208' includes substantially only eta phase cemented with the metal-solvent catalyst cementing constituent and substantially no stoichiometric WC. In other embodiments, the precursor cemented carbide substrate 208' includes eta phase, stoichiometric WC, and the metal-solvent catalyst cementing constituent. For example, in an embodiment, the precursor cemented carbide substrate 208' includes about 40 to about 60 wt % eta phase, about 40 to about 50 wt % stoichiometric WC and other carbides (if present), and about 10 to about 20 wt % metal-solvent catalyst cementing constituent. In a more specific embodiment, the metal-solvent catalyst cementing constituent may comprise about 10 to about 14 wt % of the precursor cemented tungsten carbide substrate 208', with the balance being substantially one or more types of eta phases (e.g., $Co_{3.2}W_{2.8}C$, $Co_2W_4C$, and/or $CO_6W_6C$) and stoichiometric WC. In an embodiment, the eta phase may be present in the precursor cemented carbide substrate 208' at the interfacial surface 210' and/or in a region of indeterminate shape and depth that extends inwardly from the interfacial surface 210'. In one or more of the above-described compositions for the precursor cemented carbide substrate 208', the ratio of the amount of carbon to the amount of tungsten ("C/W ratio") at the interfacial surface 210' may be less than 0.065 and, more typically, the C/W ratio may be about 0.030 to about 0.050.

The precursor cemented carbide substrate 208' and the one or more layers of diamond particles 300 may be placed in a pressure transmitting medium, such as a refractory metal can embedded in pyrophyllite or other gasket medium. The pressure transmitting medium, including the precursor cemented carbide substrate 208' and diamond particles therein, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to sinter the diamond particles to form the PCD table 202. For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the PCD table 202 becomes metallurgically bonded to the cemented tungsten carbide substrate 208.

During the HPHT process, the metal-solvent catalyst cementing constituent from the precursor cemented carbide substrate 208' may be liquefied and may infiltrate into the diamond particles of the one or more layers of diamond particles 300. The infiltrated metal-solvent catalyst cementing constituent functions as a catalyst that catalyzes formation of directly bonded-together diamond grains to form the PCD table 202. During the HPHT process, carbon from the diamond particles of the one or more layers of diamond particles 300 also diffuses into the precursor cemented carbide substrate 208' and reacts with the eta phase present in the precursor cemented carbide substrate 208' so that substantially all of the eta phase therein is converted to stoichiometric WC thereby forming the cemented tungsten carbide substrate

208. Thus, the resultant cemented tungsten carbide substrate 208 is substantially free of eta phase, which can decrease fracture toughness or cause degradation of other mechanical properties. The geometry of the cemented tungsten carbide substrate 208 may be substantially congruent with the geometry of the precursor cemented carbide substrate 208' after HPHT processing.

If the precursor cemented carbide substrate 208' was generally free of the eta phase and instead included substantially only stoichiometric WC cemented with a metal-solvent catalyst cementing constituent, the carbon from the diamond particles of the one or more layers of diamond particles 300 would react with tungsten in solid solution with the liquefied metal-solvent catalyst cementing constituent and precipitate as elongated stoichiometric WC grains (known as tungsten carbide grains exhibiting AGG) that project into the diamond particles of the one or more layers of diamond particles 300 being sintered to thereby cause defects in the PCD table being formed. For example, at the HPHT process conditions, tungsten has a solubility of about 40 wt % in cobalt. Such tungsten in solid solution with cobalt would react with carbon diffused from the diamond particles of the one or more layers of diamond particles 300 into the substrate and precipitate as tungsten carbide grains exhibiting AGG during cooling from the HPHT process.

As an alternative to or in addition to using the precursor cemented carbide substrate 208' to limit formation of tungsten carbide grains exhibiting AGG during HPHT processing, in another embodiment, a plurality carbide-forming particles, a plurality of carbon-deficient carbide particles, a plurality of cemented carbide particles including one or more types of tungsten-containing eta phases, or combinations thereof may be mixed with the plurality of diamond particles of the one or more layers of diamond particles 300 to form a mixture. The carbide-forming particles may comprise chromium, tungsten, molybdenum, vanadium, titanium, niobium, tantalum, zirconium, iron, alloys thereof, or combinations of the forgoing. The carbon-deficient carbide particles may comprises carbon-deficient carbide particles of chromium, tungsten, molybdenum, vanadium, titanium, niobium, tantalum, zirconium, iron, or combinations of the forgoing. In an embodiment, tungsten particles (e.g., substantially pure tungsten particles), carbon-deficient tungsten carbide particles (e.g., $W_2C$ particles), or combinations of the foregoing may be mixed with the diamond particles to form the mixture. In an embodiment, the mixture may include a plurality carbide-forming particles and/or carbon-deficient carbide particles in an amount of about 1 wt % to about 20 wt %, such as about 5 wt % to about 10%. For example, the mixture may include approximately 10 wt % tungsten particles. The addition of the carbide-forming particles, the carbon-deficient carbide particles, and/or the cemented carbide particles including one or more types of tungsten-containing eta phases helps limit or prevent formation of tungsten carbide grains exhibiting AGG at the interface between the cemented carbide substrate and the PCD table so-formed during HPHT processing. The PCD table so-formed may include one or carbides (e.g., stoichiometric WC) as a result of the carbide-forming particles, the carbon-deficient carbide particles, and/or the tungsten-containing eta phase particles reacting with carbon from the diamond particles during the HPHT process.

As an alternative to or in addition to using the precursor cemented carbide substrate 208' and/or mixing carbide-forming particles and/or carbon-deficient carbide particles with the diamond particles to limit formation of tungsten carbide grains exhibiting AGG during HPHT processing, in another embodiment, a plurality cemented carbide particles including one or more types of tungsten-containing eta phases, a layer comprising a cemented carbide material including one or more types of tungsten-containing eta phases, carbide-forming particles, carbon-deficient carbide particles, or combinations thereof may be positioned between the one or more layers of diamond particles 300 and an interfacial surface of a cemented tungsten carbide substrate. The presence of the eta phase, carbide-forming particles, and/or carbon-deficient carbide particles helps limit or prevent formation of tungsten carbide grains exhibiting AGG at the interface between the cemented tungsten carbide substrate and the PCD table so-formed during HPHT processing.

Figure 4:
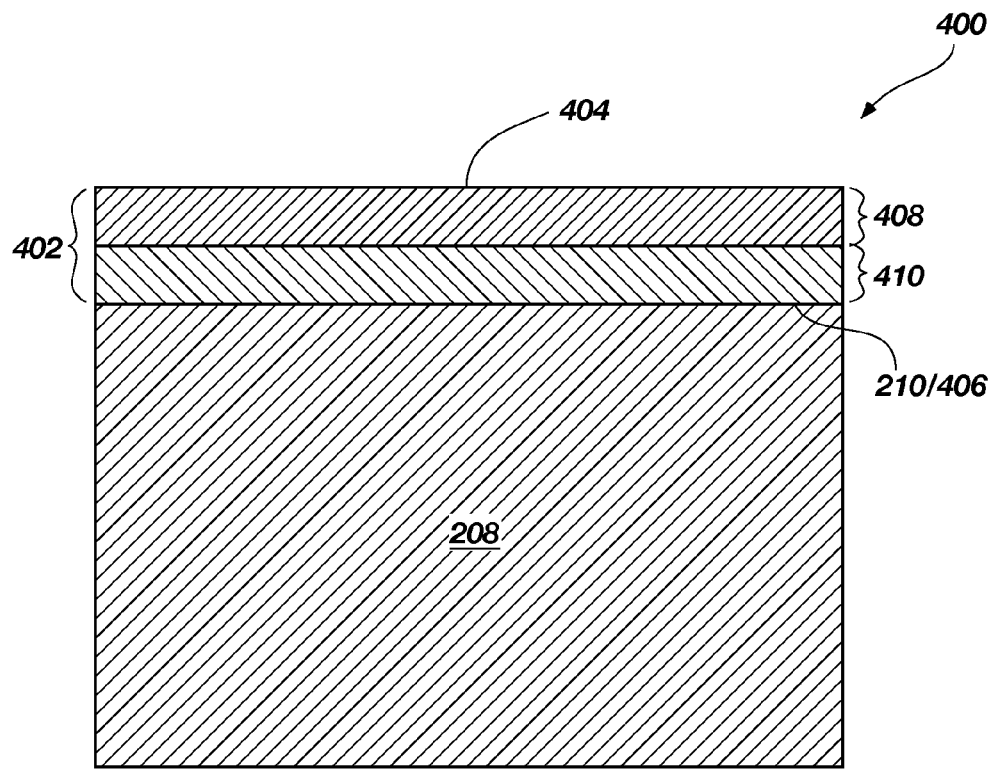
FIG. 4 is a cross-sectional view of an embodiment of a PDC including a pre-sintered PCD table that is substantially free of defects due to tungsten carbide grains exhibiting AGG and bonded to a cemented carbide substrate that is substantially free of tungsten carbide grains exhibiting AGG.

FIG. 4 is a cross-sectional view of an embodiment of a "two-step" PDC 400 including a pre-sintered PCD table 402 that is substantially free of defects due to tungsten carbide grains exhibiting AGG and bonded to a cemented tungsten carbide substrate 208 that is substantially free of tungsten carbide grains exhibiting AGG. The pre-sintered PCD table 402 includes a working, upper surface 404 and an opposing substrate interfacial surface 406 that is bonded to the interfacial surface 210 of the cemented tungsten carbide substrate 208. The pre-sintered PCD table 402 is substantially free of defects (e.g., pits, cracks, or combinations thereof) due to being formed on a cemented tungsten carbide substrate in which AGG of tungsten carbide grains did not occur and, in particular, the substrate interfacial surface 406 is substantially free of such defects. The pre-sintered PCD table 402 includes a first region 408 extending inwardly from the upper surface 404 and a second region 410 extending inwardly from the substrate interfacial surface 406.

The pre-sintered PCD table 402 includes a plurality of directly bonded-together diamond grains defining a plurality of interstitial regions. In an embodiment, the pre-sintered PCD table 402 may have been formed on a cemented tungsten carbide substrate and, therefore, the pre-sintered PCD table 402 may include a tungsten-containing material interstitially disposed between the bonded diamond grains thereof, such as substantially pure tungsten, tungsten carbide, a tungsten alloy, or combinations thereof. In another embodiment, the pre-sintered PCD table 402 may not have been formed in the presence of tungsten and, in such an embodiment, the pre-sintered PCD table 402 may not include a tungsten-containing material. The interstitial regions of the second region 410 may include an infiltrant disposed therein infiltrated, for example, from the cemented tungsten carbide substrate 208, such as cobalt, iron, nickel, or alloys thereof. In an embodiment, the interstitial regions of the first region 408 may be substantially free of a metal-solvent catalyst included in and infiltrated from the cemented tungsten carbide substrate 208. For example, in an embodiment, the interstitial regions of the first region 408 may include an infiltrant disposed therein and/or a reaction product between the infiltrant and the diamond grains disposed therein, such as silicon, a silicon-cobalt alloy, silicon carbide, cobalt carbide, a mixed carbide of silicon and cobalt, a nonmetallic catalyst (e.g., a carbonate material), or combinations thereof. In other embodiments, the interstitial regions of the first region 408 may not include an infiltrant and/or a reaction product disposed therein. However, in other embodiments, the interstitial regions of the first region 408 may include the same type of infiltrant that infiltrated the second region 410 from the cemented tungsten carbide substrate 208. Similar to the PCD table 202 shown in FIG. 2, in some embodiments, the pre-sintered PCD table 402 may be substantially free of chromium, for example, when the cemented tungsten carbide substrate 208 bonded thereto is substantially free of chromium. In an embodiment, the pre-sintered PCD table 402 may include chromium infiltrated from the cemented tungsten carbide substrate 208 that may include chromium carbide and/or introduced into the pre-sintered PCD table 402 during formation thereof.

Figure 5:
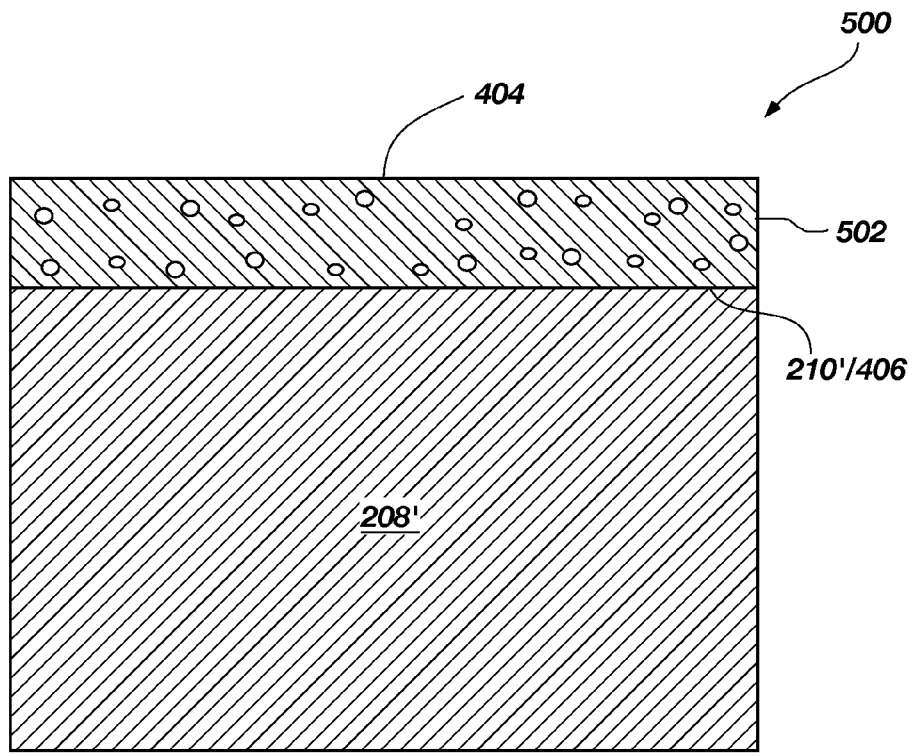
FIG. 5 is a cross-sectional view of an assembly to be HPHT processed to form the PDC shown in FIG. 4.

FIG. 5 is a cross-sectional view of an assembly 500 to be HPHT processed to form the PDC 400 shown in FIG. 4. The assembly 500 comprises an at least partially leached PCD table 502 including the upper surface 404 and the substrate interfacial surface 406. The at least partially leached PCD table 502 is substantially free of defects (e.g., pits, cracks, or combinations thereof) due to being formed on a cemented tungsten carbide substrate in which AGG of tungsten carbide grains did not occur or due to not being formed on a cemented carbide substrate. In particular, the substrate interfacial surface 406 is substantially free of such defects. Cracking in the at least partially leached PCD table 502 is reduced or eliminated during HPHT processing because the at least partially leached PCD table 502 is substantially free of such defects that can serve as stress concentrations. The at least partially leached PCD table 502 includes a plurality of directly bonded-together diamond grains defining interstitial regions that form a network of at least partially interconnected pores that enable fluid to flow from the substrate interfacial surface 406 to the upper surface 404. The at least partially leached PCD table 502 is positioned so that the substrate interfacial surface 406 thereof is positioned adjacent to the interfacial surface 210' of a carbon-deficient precursor cemented carbide substrate 208' that includes one or more types of tungsten-containing eta phases.

In an embodiment, the at least partially leached PCD table 502 may be formed by separating the PCD table 202 from the cemented tungsten carbide substrate 208 shown in FIG. 2, and removing at least a portion of or substantially all the metal-solvent catalyst therefrom by leaching. For example, the PCD table 202 may be separated by grinding and/or lapping away the cemented tungsten carbide substrate 208, electro-discharge machining, or combinations of the foregoing material removal processes. The metal-solvent catalyst may be at least partially removed from the separated PCD table 202 by immersing the separated PCD table 202 in an acid, such as aqua regia, nitric acid, hydrofluoric acid, or other suitable acid, to form the at least partially leached PCD table 502. In some embodiments, a residual amount of the metal-solvent catalyst may still remain even after leaching. For example, the separated PCD table 202 may be immersed in the acid for about 2 to about 7 days (e.g., about 3, 5, or 7 days) or for a few weeks (e.g., about 4 weeks) depending on the process employed. It is noted that because the metal-solvent catalyst is infiltrated into the diamond particles from a cemented tungsten carbide substrate including tungsten carbide grains cemented with a metal-solvent catalyst (e.g., cobalt, nickel, iron, or alloys thereof), the infiltrated metal-solvent catalyst may carry tungsten and/or tungsten carbide therewith and the PCD table 202 may include such tungsten and/or tungsten carbide therein disposed interstitially between the bonded diamond grains. The tungsten and/or tungsten carbide may be at least partially removed by the selected leaching process or may be relatively unaffected by the selected leaching process.

In another embodiment, the at least partially leached PCD table 502 may be formed by HPHT sintering a plurality of diamond particles in the presence of a metal-solvent catalyst and removing at least a portion of or substantially all the metal-solvent catalyst from sintered PCD body by leaching. For example, the metal-solvent catalyst may be infiltrated into the diamond particles from a metal-solvent catalyst disc (e.g., a cobalt disc), mixed with the diamond particles, or combinations of the foregoing.

The assembly 500 may be placed in a pressure transmitting medium, such as a refractory metal can embedded in pyrophyllite or other gasket medium. The pressure transmitting medium, including the assembly 500, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) so that the metal-solvent catalyst cementing constituent in the precursor cemented carbide substrate 208' is liquefied and infiltrates into the at least partially leached PCD table 502. For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the infiltrated PCD table represented as the pre-sintered PCD table 402 in FIG. 4 becomes bonded to the cemented tungsten carbide substrate 208.

During the HPHT process, carbon from the at least partially leached PCD table 502 diffuses into the carbon-deficient precursor cemented carbide substrate 208' to substantially convert all of the eta phase therein to stoichiometric WC and form the cemented tungsten carbide substrate 208 (FIG. 4). However, depending upon the HPHT process conditions, a residual amount of eta phase may remain in the cemented tungsten carbide substrate 208 after HPHT processing.

In one embodiment, the HPHT process conditions may be accurately controlled so that the metal-solvent catalyst cementing constituent from the precursor cemented carbide substrate 208' only partially infiltrates the at least partially leached PCD table 502 to form the second region 410 (FIG. 4) and the interstitial regions of the first region 408 remain unfilled by the metal-solvent catalyst cementing constituent. The distance that the metal-solvent catalyst cementing constituent infiltrates into the at least partially leached PCD table 502 may be controlled by selecting the pressure, temperature, and/or process time employed in the HPHT process. In one embodiment, the assembly 500 may be subjected to a temperature of about 1150° C. to about 1300° C. (e.g., about 1270° C. to about 1300° C.) and a corresponding pressure that is within the diamond stable region, such as about 5.0 GPa. Such temperature and pressure conditions are lower than temperature and pressure conditions typically used to fully infiltrate the at least partially leached PCD table 502.

In other embodiments, the metal-solvent catalyst cementing constituent from the precursor cemented carbide substrate 208' substantially infiltrates the at least partially leached PCD table 502 so that the interstitial regions of the first region 408 (FIG. 4) are also filled by the metal-solvent catalyst cementing constituent that infiltrates the interstitial regions of the second region 410 (FIG. 4). In an embodiment, the metal-solvent catalyst cementing constituent that occupies the interstitial regions of the first region 408 (FIG. 4) may be at least partially removed in a subsequent leaching process using an acid (e.g., aqua regia, nitric acid, hydrofluoric acid, or other suitable acid). For example, the leaching process may substantially remove all of the metal-solvent catalyst cementing constituent to a selected depth from the upper surface 404 of about 50 μm to about 1000 μm (e.g., about 200 μm to about 500 μm).

Referring again to FIG. 4, in another embodiment, the interstitial regions of the first region 408 may be infiltrated before, during, or after the HPHT processing that bonds the pre-sintered PCD table 402 to the cemented tungsten carbide substrate 208, such as with a nonmetallic catalyst. For example, the nonmetallic catalyst may be selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur and/or a derivative thereof, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. For example, one suitable carbonate catalyst is an alkali metal carbonate material including a mixture of sodium carbonate, lithium carbonate, and potassium carbonate that form a low-melting ternary eutectic system. This mixture and other suitable alkali metal carbonate materials are disclosed in U.S. patent application Ser. No. 12/185,457, which is incorporated herein, in its entirety, by this reference. The alkali metal carbonate material disposed in the interstitial regions of the first region 408 (FIG. 4) may be partially or substantially completely converted to one or more corresponding alkali metal oxides by suitable heat treatment following infiltration.

Referring again to FIG. 5, in another embodiment, at least one layer of silicon, a silicon-cobalt alloy, or a mixture of cobalt and silicon particles may be disposed adjacent to the upper surface 404 of the at least partially leached PCD table 502 and may infiltrate the at least partially leached PCD table 502 during the HPHT process to fill the interstitial regions of the first region 408 (FIG. 4) with an infiltrant and/or a reaction product between the infiltrant and the diamond grains. As previously discussed, such an infiltrant and/or a reaction product may include silicon, a silicon-cobalt alloy (e.g., cobalt silicide), silicon carbide, cobalt carbide, a mixed carbide of cobalt and silicon, or combinations of the foregoing. For example, silicon carbide, cobalt carbide, and/or a mixed carbide of cobalt and silicon are reaction products that may be formed by the infiltrant reacting with the diamond grains of the at least partially leached PCD table 502. In an embodiment, the layer includes silicon particles present in an amount of about 50 to about 60 wt % and cobalt particles present in an amount of about 40 to about 50 wt %. In a more specific embodiment, the layer includes silicon particles and cobalt particles present in an amount of about equal to or near a eutectic composition of the silicon-cobalt chemical system. In some embodiments, the silicon particles and cobalt particles may be held together by an organic binder to form a green layer of cobalt and silicon particles. In another embodiment, the layer may comprise a thin sheet of a silicon-cobalt alloy or a green layer of silicon-cobalt alloy particles formed by mechanical alloying having a low-melting eutectic or near eutectic composition.

As an alternative to or in addition to using the precursor cemented carbide substrate 208' to limit formation of tungsten carbide grains exhibiting AGG during HPHT processing of the assembly 500 shown in FIG. 5, in another embodiment, a plurality of cemented carbide particles including one or more types of tungsten-containing eta phases, a layer comprising a cemented carbide material including one or more types of tungsten-containing eta phases, carbide-forming particles, carbon-deficient carbide particles, or combinations thereof may be positioned between the at least partially leached PCD table 502 and the interfacial surface 210' of the precursor cemented carbide substrate 208'. The presence of the eta phase, carbide-forming particles, and/or carbon-deficient carbide particles helps limit or prevent formation of tungsten carbide grains exhibiting AGG at the interface between the cemented carbide substrate 208' and the at least partially leached PCD table 502 during HPHT processing.

The carbon-deficient precursor cemented carbide substrate 208' that includes the eta phase may be formed by sintering carbon-deficient tungsten carbide particles (e.g., $WC_x$ particles where x may be any real number greater than zero and less than 1) with any of the aforementioned metal-solvent catalyst cementing constituents, such as cobalt, nickel, iron, or alloys thereof, so that the eta phase is formed and distributed generally uniformly throughout the sintered microstructure. In another embodiment, stoichiometric tungsten carbide particles (i.e., WC particles) may be milled (e.g., ball milled) with particles made from any of aforementioned metal-solvent catalyst cementing constituents in an oxidizing atmosphere, such as air or other oxygen-containing environment. Under such oxidizing conditions, the WC particles may oxidize during the milling process so that carbon-deficient tungsten carbide particles are formed, and the eta phase is formed upon sintering such carbon-deficient tungsten carbide particles with the particles ball milled therewith and made from the metal-solvent catalyst cementing constituent. In such an embodiment, the eta phase is distributed generally uniformly throughout the sintered microstructure.

In yet another embodiment, a cemented tungsten carbide substrate including stoichiometric WC grains cemented with any of the aforementioned metal-solvent catalyst cementing constituents may be coated with an oxide slurry, such as a slurry of aluminum oxide, titanium oxide, and/or zirconium oxide. The coated substrate may be heated in an oxidizing atmosphere (e.g., air) at approximately the same temperature at which the cemented tungsten carbide substrate was sintered to form eta phase in a region adjacent to the coating. The coating may be removed after forming the region including the eta phase. In practice, a plurality of diamond particles to be HPHT sintered may be positioned adjacent to the region or an at least partially leached PCD table may be positioned adjacent to the region to be HPHT bonded thereto.

The following working examples provide further detail in connection with the specific PDC embodiments described above.

Working Example 1

A PDC was formed according to the following process. A layer of diamond particles having an average particle size of about 19 μm was placed adjacent to a cobalt-cemented tungsten carbide substrate. The cobalt-cemented tungsten carbide substrate was carbon deficient and included a significant amount of eta phase in addition to stoichiometric WC as determined using optical microscopy. The diamond particles and the cobalt-cemented tungsten carbide substrate were positioned within a pyrophyllite cube, and HPHT processed at a temperature of about 1400° C. and a pressure of about 5 GPa to about 7 GPa in a high-pressure cubic press to form a PDC. The PDC so-formed included a PCD table integrally formed with and bonded to the cobalt-cemented tungsten carbide substrate. Scanning acoustic microscope images of the PDC so-formed showed an absence of tungsten carbide grains exhibiting AGG at the interface between the PCD table and the cobalt-cemented tungsten carbide substrate. Furthermore, after HPHT processing, scanning acoustic microscope images of the PDC so-formed showed that the eta phase that was previously present in the cobalt-cemented tungsten carbide substrate prior to HPHT processing was converted to stoichiometric WC.

Working Example 2

A PDC was formed according to the following process. A mixture of about 90 wt % diamond particles having an average particle size of about 19 μm and about 10 wt % tungsten powder was formed. A layer of the mixture was placed adjacent to a cobalt-cemented tungsten carbide substrate. The cobalt-cemented tungsten carbide substrate was substantially free of eta phases. The layer and the cobalt-cemented tungsten carbide substrate were positioned within a pyrophyllite cube, and HPHT processed at a temperature of about 1400° C. and a pressure of about 5 GPa to about 7 GPa in a high-pressure cubic press to form a PDC. The PDC so-formed included a PCD table integrally formed with and bonded to the cobalt-cemented tungsten carbide substrate. Scanning acoustic microscope images of the PDC so-formed showed an absence of tungsten carbide grains exhibiting AGG at the interface between the PCD table and the cobalt-cemented tungsten carbide substrate.

Figure 6:
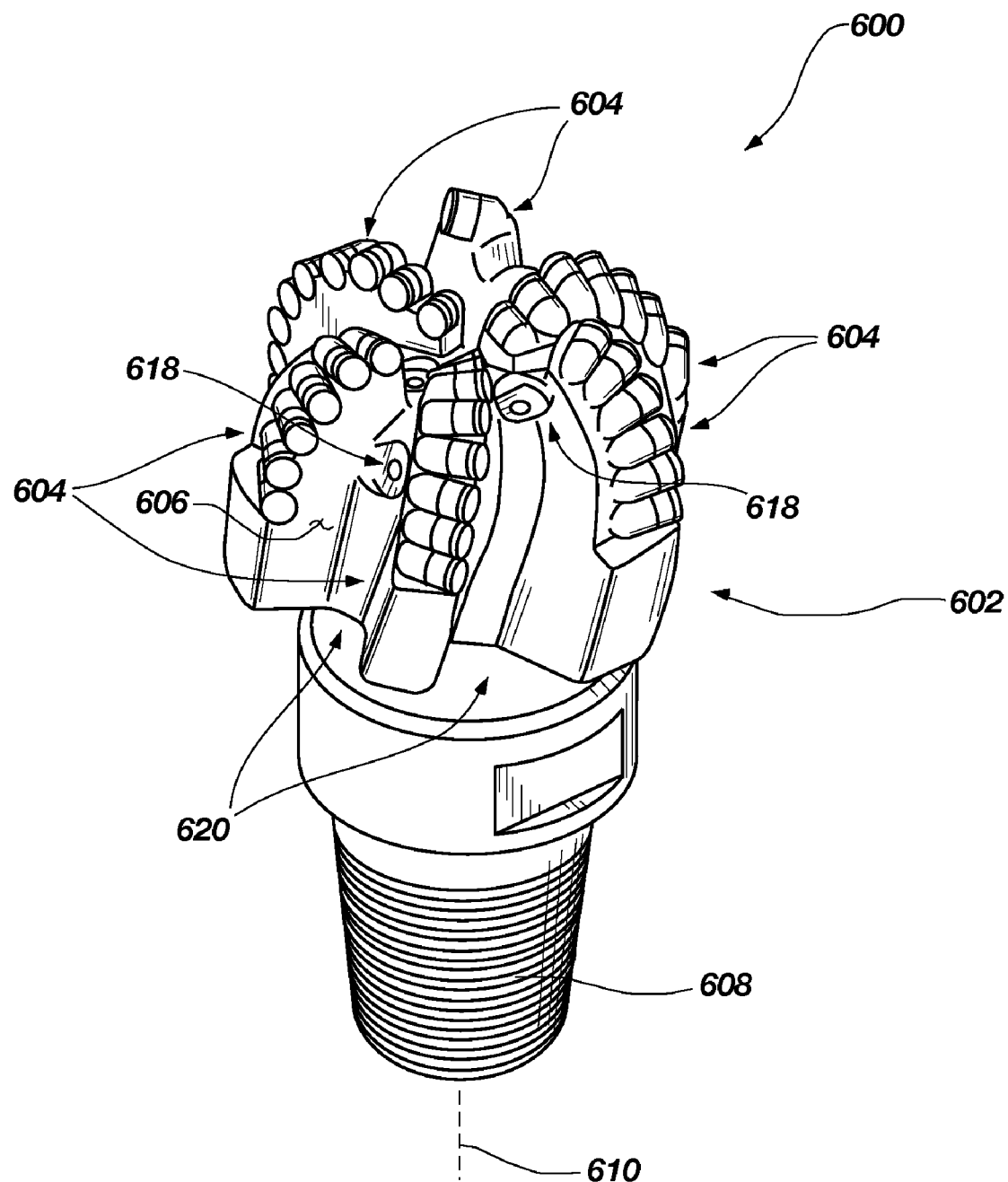
FIG. 6 is an isometric view of an embodiment of a rotary drill bit that may employ one or more of the disclosed PDC embodiments.
Figure 7:
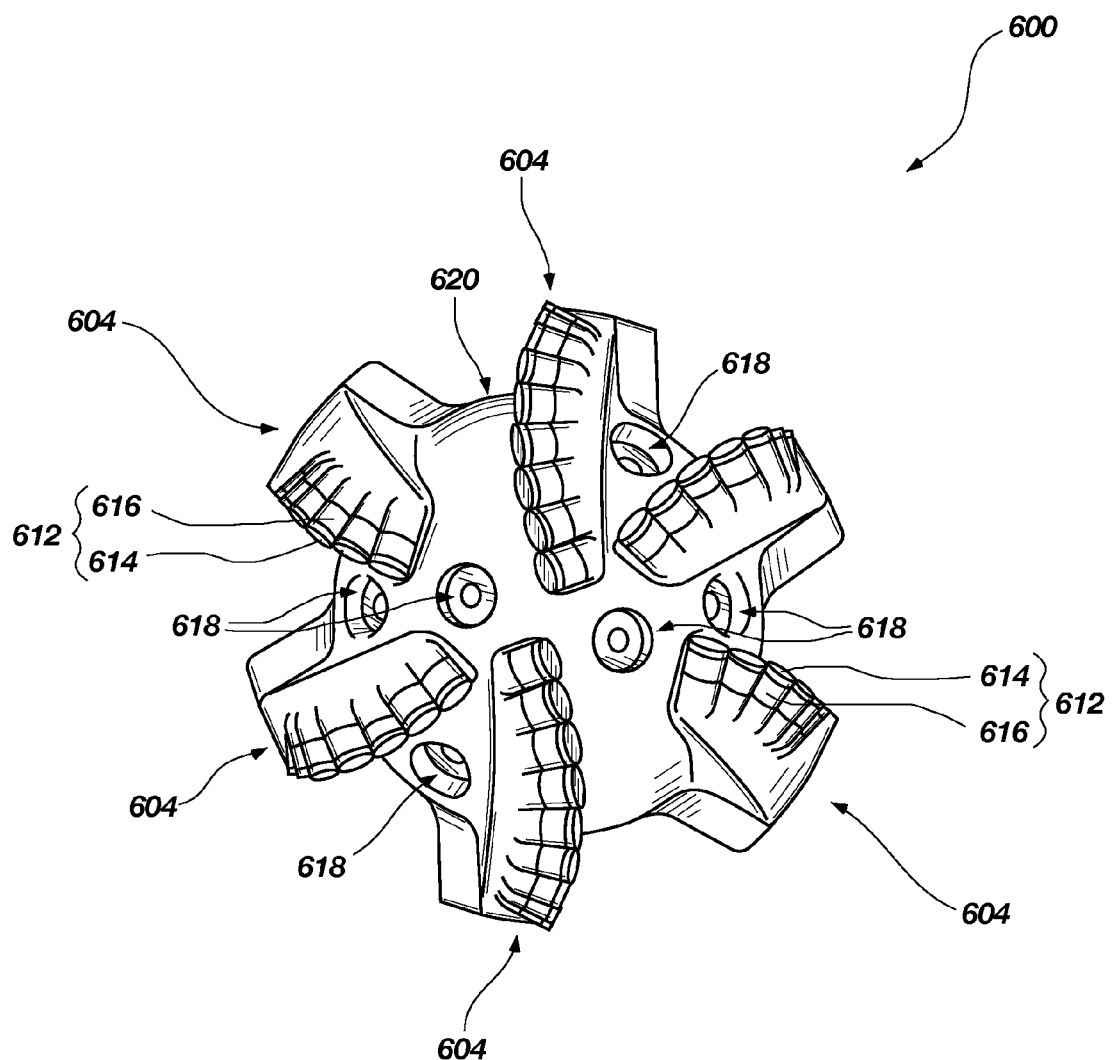
FIG. 7 is a top elevation view of the rotary drill bit shown in FIG. 6.

FIG. 6 is an isometric view and FIG. 7 is a top elevation view of an embodiment of a rotary drill bit 600 that includes at least one PDC configured according to any of the disclosed PDC embodiments. The rotary drill bit 600 comprises a bit body 602 that includes radially and longitudinally extending blades 604 having leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC, configured according to any of the previously described PDC embodiments, may be affixed to the bit body 602. With reference to FIG. 7, a plurality of PDCs 612 are secured to the blades 604 of the bit body 602 (FIG. 6). For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 620 therebetween. Additionally, the rotary drill bit 600 includes a plurality of nozzle cavities 618 for communicating drilling fluid from the interior of the rotary drill bit 600 to the PDCs 612.

FIGS. 6 and 7 merely depict one embodiment of a rotary drill bit that employs at least one PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 200 of FIG. 2 or the PDC 400 of FIG. 4) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 200 of FIG. 2 or the PDC 400 of FIG. 4) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A polycrystalline diamond compact precursor assembly, comprising:
 a cemented tungsten carbide substrate including a table interfacial surface, the cemented tungsten carbide substrate including one or more types of tungsten-containing eta phases; and
 an at least partially leached polycrystalline diamond table positioned adjacent to the table interfacial surface of the cemented tungsten carbide substrate, the at least partially leached polycrystalline diamond table including bonded diamond grains defining interstitial regions and a tungsten-containing material, the at least partially leached polycrystalline diamond table being substantially free of defects formed due to abnormal grain growth of tungsten carbide grains during the fabrication thereof.

2. The polycrystalline diamond compact precursor assembly of claim 1 wherein the defects comprise pits.

3. The polycrystalline diamond compact precursor assembly of claim 1 wherein each of the cemented tungsten carbide substrate and the at least partially leached polycrystalline diamond table is substantially free of chromium.

4. The polycrystalline diamond compact precursor assembly of claim 1 wherein the cemented tungsten carbide substrate comprises substantially only the one or more types of tungsten-containing eta phases cemented together with an infiltrant.

5. The polycrystalline diamond compact precursor assembly of claim 1 wherein the at least partially leached polycrystalline diamond table is substantially free of a metal-solvent catalyst used in the sintering thereof.

6. The polycrystalline diamond compact precursor assembly of claim 1 wherein the tungsten-containing material of the at least partially leached polycrystalline diamond table comprises at least one member selected from the group consisting of substantially pure tungsten, a tungsten alloy, and tungsten carbide.

7. The polycrystalline diamond compact precursor assembly of claim 1 wherein the cemented tungsten carbide substrate comprises at least one additional carbide selected from the group consisting of tantalum carbide, vanadium carbide, niobium carbide, chromium carbide, and titanium carbide.

8. The polycrystalline diamond compact precursor assembly of claim 1 wherein the bonded diamond grains exhibit diamond-to-diamond bonding therebetween.

9. The polycrystalline diamond compact precursor assembly of claim 1 wherein the table interfacial surface is substantially planar.

10. The polycrystalline diamond compact precursor assembly of claim 1 wherein the one or more types of tungsten-containing eta phases comprise $Co_{3.2}W_{2.8}C$, $Co_2W_4C$, $Co_6W_6C$, or combinations of the foregoing.

11. The polycrystalline diamond compact precursor assembly of claim 1 wherein the defects comprise cracks.

12. The polycrystalline diamond compact precursor assembly of claim 1 wherein the at least partially leached polycrystalline diamond table comprises a substrate interfacial surface that is positioned adjacent to the table interfacial surface of the cemented tungsten carbide substrate and substantially free of the defects.

13. The polycrystalline diamond compact precursor assembly of claim 1 wherein the at least partially leached polycrystalline diamond table was fabricated by sintering diamond particles on a cemented carbide substrate.

* * * * *